US010549194B2

(12) United States Patent
Meurling et al.

(10) Patent No.: US 10,549,194 B2
(45) Date of Patent: Feb. 4, 2020

(54) METHOD AND APPARATUS FOR PROVIDING A COMPUTER IMPLEMENTED GAME HAVING GAME ELEMENTS DISPLAYED ON A GAME BOARD COMPRISING GAME TILES HAVING CHANGEABLE CHARACTERISTICS

(71) Applicant: KING.COM LIMITED, St. Julians (MT)

(72) Inventors: Richard Meurling, Stockholm (SE); Rabi Afram, Stockholm (SE)

(73) Assignee: KING.COM LTD., St. Julians (MT)

( * ) Notice: Subject to any disclaimer, the term of this patent is extended or adjusted under 35 U.S.C. 154(b) by 464 days.

(21) Appl. No.: 15/372,019

(22) Filed: Dec. 7, 2016

(65) Prior Publication Data

US 2018/0154263 A1   Jun. 7, 2018

(51) Int. Cl.
| | | |
|---|---|---|
| A63F 13/55 | (2014.01) | |
| A63F 13/25 | (2014.01) | |
| A63F 13/822 | (2014.01) | |
| A63F 13/85 | (2014.01) | |
| A63F 13/2145 | (2014.01) | |
| A63F 13/335 | (2014.01) | |

(52) U.S. Cl.
CPC .............. *A63F 13/55* (2014.09); *A63F 13/25* (2014.09); *A63F 13/822* (2014.09)

(58) Field of Classification Search
CPC ....................................................... G07F 17/34
See application file for complete search history.

(56) References Cited

U.S. PATENT DOCUMENTS 9,993,721 B2 * 6/2018 Palermo .................... A63F 9/24
2016/0220898 A1 * 8/2016 Nyblom .................. A63F 13/80

* cited by examiner

*Primary Examiner* — Robert T Clarke, Jr.
(74) *Attorney, Agent, or Firm* — Saul Ewing Arnstein & Lehr LLP

(57) ABSTRACT

A computer device has a touch screen which displays game elements. A user is able to move game elements to make a match. When a match is made, the game elements of the match are removed. Each game element is associated with a tile. A subset of the tiles is able to toggle between a set of characteristics each time a game element, associated with a tile of the subset, is removed. A game objective is satisfied when the subset of tiles have a respective predefined characteristic one of the set of characteristics.

17 Claims, 11 Drawing Sheets

METHOD AND APPARATUS FOR PROVIDING A COMPUTER IMPLEMENTED GAME HAVING GAME ELEMENTS DISPLAYED ON A GAME BOARD COMPRISING GAME TILES HAVING CHANGEABLE CHARACTERISTICS

FIELD OF THE INVENTION

Embodiments of this application relate to a user device for use in playing a computer implemented game.

Some embodiments may relate to engaging users or players in a computer game executable in an online environment.

The embodiments may have particular, but not exclusive application in the field of computer implemented applications including for example games, in an online or offline environment, and computing devices therefor.

BACKGROUND OF THE INVENTION

In the field of computer-implemented games, there are many technical challenges facing the designer of such games when considering how, for example, the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear. An existing type of match-three game is a so-called "switcher" game. In a switcher game, the player switches place onto adjacent game elements on the game board so that one or both of them create a chain of at least three adjacent game elements of the same type. Those matched game elements will then disappear. The game board is then repopulated with game objects.

One such known match three-type game is known by the trade name Candy Crush. In that game, the game board is repopulated with game elements which are perceived as falling downwards onto the game board from the top edge of the screen from which the game is played.

Another known type of game is "linker game", where a sequence of game elements are linked to form a known sequence. Another type of game is a 'clicker' game, in which matches can be made in a board by clicking adjacent game elements.

A technical challenge exists when introducing complexity into such match games. In particular it is desirable to be able control the difficulty of a particular game level. It is desirable for the player to have some control over the game play. It can be technically challenging to achieve one or more of these objectives where a user makes a move, leading to the removal of game elements. The replenishment of these game elements can set off a "chain reaction" where the replenished game elements make a match and so on.

This patent specification describes not only various ideas and functions, but also their creative expression. A portion of the disclosure of this patent document therefore contains material to which a claim for copyright is made and notice is hereby given: Copyright King.com Limited 2016 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

Aspects may provide improved methods of controlling a user interface in the context of a computer-implemented game of a matching type (switcher, clicker or linker). Some aspects may provide a solution to the technical problem of improved user engagement by providing a new user engagement mode, which is implemented by a processor and data structure in a computer device.

According to an aspect, there is provided a computer device having: a display configured to display game elements in a game board of tiles of a computer implemented game, a subset of the tiles each having one of a plurality of available characteristics; a user interface configured to detect user input when a user engages with a game element of the displayed game elements; at least one processor configured to: (a) receive a detected user input and in response thereto determine that one or more game elements are to be removed from the displayed game board; (b) determine if any one or more of the game elements to be removed is associated with a respective one of the subset of tiles and in response to said determination, that one or more of the game elements are associated with respective one of the subset of tiles, change a respective characteristic of the respective tile of the subset of tiles to a different one of the plurality of characteristics; and (c) determine for the subset of tiles if the respective characteristics of all of the tiles of the subset of tiles satisfy a predetermined end game condition.

It should be appreciated that the game elements may be removed at any suitable point. For example, the game elements may be removed before or after the updating of the respective tile characteristic.

The at least one processor may be configured to, when a plurality of game elements associated with respective ones of the subset of tiles is to removed, update a respective characteristic of a single one of the tiles of the subset of tiles and then to determine for the subset of tiles if the respective characteristics of all of the tiles of the subset of tiles satisfy a predetermined end game condition, and if not to repeat the updating and determining for at least one further game element associated with a respective one of the subset of tiles until either the predetermined end game condition is satisfied or all of tiles of the subset of tiles associated with respective game elements to be removed have had their respective characteristic updated.

The at least one processor may be configured to, when a plurality of game elements associated with respective ones of the subset of tiles is to be removed, update a respective characteristic of all of the tiles of the subset of tiles associated with respective game elements to removed and then to determine for the subset of tiles if the respective characteristics of all of the tiles of the subset of tiles satisfy a predetermined end game condition.

The at least one processor may be configured to generate replacement game elements for the game board displayed by the display, wherein the determining for the subset of tiles if the respective characteristics of all of the tiles of the subset of tiles satisfy the predetermined end game condition is only performed when the game board is replenished and no further game elements are to be removed.

The at least one processor is be configured when the predetermined end game condition is not satisfied to generate replacement game elements for the game board displayed by the display, wherein when one or more game elements are to be removed as a result of the generation of the replacement game elements, the at least one processor is configured to repeat steps (b) and (c).

The at least one processor may be configured to detect a match game condition associated with the game elements to remove at least three game elements from the display.

The at least one processor may be configured to detect a triggering of game element removal object in response to a match game condition to cause the removal of at least one game element from the display.

The at least one processor may be configured to detect a use of game element removal object to cause the removal of at least one game element from the display.

The subset of the tiles may have a fixed position with respect to the game board.

The display may be configured to display the game board at a beginning of a game, the subset of tiles having a first one of the plurality of characteristics.

The at least one processor may be configured to determine that the predetermined end game condition is satisfied when the subset of tiles have a different one of the plurality of characteristics to the first one of the plurality of characteristics.

The at least one processor may be configured to determine that the predetermined end game condition is satisfied when the subset of tiles all have a predefined one of the plurality of characteristics.

The subset of tiles may each have one of two different characteristics, each tile of the subset changing from one characteristic to another each time a game element associated with the respective tile is removed.

According to another aspect, there is provided a non-transitory computer readable storage device storing instructions that, when executed by at least one processor of a computer device causes the at least one processor to: cause display of game elements in a game board of tiles of a computer implemented game, a subset of the tiles each having one of a plurality of available characteristics; receive a detected user input when a user engages with a game element of the displayed game elements in a move and in response thereto determine that one or more game elements are to be removed from the displayed game board; determine if any one or more of the game elements to be removed is associated with a respective one of the subset of tiles and when a game element associated with respective one of the subset of tiles is to be removed, to change a respective characteristic of the respective tile of the subset of tiles to a different one of the plurality of characteristics; determine for the subset of tiles if the respective characteristics of all of the tiles of the subset of tiles satisfy a predetermined end game condition, and when the predetermined end game condition is satisfied, end the game.

According to another aspect, there is provided a computer implemented method performed by a computer device, the computer device having at least one processor, at least one memory, a display, and a user interface, the method comprising: displaying by the display game elements in a game board of tiles of a computer implemented game, a subset of the tiles each having one of a plurality of available characteristics; detecting user input via the user interface when a user engages with a game element of the displayed game elements; receiving by the at least one processor a detected user input and in response thereto determine that one or more game elements are to be removed from the displayed game board; determining by the at least one processor if any one or more of the game elements to be removed is associated with a respective one of the subset of tiles and in response to said determination, that one or more of the game elements are associated with respective one of the subset of tiles, change a respective characteristic of the respective tile of the subset of tiles to a different one of the plurality of characteristics; and determining by the at least one processor for the subset of tiles if the respective characteristics of all of the tiles of the subset of tiles satisfy a predetermined end game condition.

The method may comprise when a plurality of game elements associated with respective ones of the subset of tiles is to be removed, updating a respective characteristic of a single one of the tiles of the subset of tiles and then determining for the subset of tiles if the respective characteristics of all of the tiles of the subset of tiles satisfy a predetermined end game condition, and if not repeating the updating and determining for at least one further game element associated with a respective one of the subset of tiles until either the predetermined end game condition is satisfied or all of tiles of the subset of tiles associated with respective game elements have had their respective characteristic updated.

The method may comprise, when a plurality of game elements associated with respective ones of the subset of tiles is to removed, updating a respective characteristic of all of the tiles of the subset of tiles associated with respective game elements and then determining for the subset of tiles if the respective characteristics of all of the tiles of the subset of tiles satisfy a predetermined end game condition.

The method may comprise generating replacement game elements for the game board displayed by the display, wherein the determining for the subset of tiles if the respective characteristics of all of the tiles of the subset of tiles satisfy the predetermined end game condition is only performed when the game board is replenished and no further game elements are to be removed.

The method may comprise when the predetermined end game condition is not satisfied generating replacement game elements for the game board displayed by the display, wherein when one or more game elements are to be removed as a result of the generation of the replacement game elements, method may comprise repeating of steps (b) and (c).

The method may comprise detecting by the at least one processor a match game condition associated with the game elements to remove at least three game elements from the display.

The method may comprise detecting by the at least one processor of a triggering of a game element removal object in response to a match game condition to cause the removal of at least one game element from the display.

The method may comprise detecting by the at least one processor a use of a game element removal object to cause the removal of at least one game element from the display.

The subset of the tiles may have a fixed position with respect to the game board.

The method may comprise displaying by the display of the game board at a beginning of a game, the subset of tiles having a first one of the plurality of characteristics.

The method may comprise determining by the at least one processor that the predetermined end game condition is satisfied when the subset of tiles have a different one of the plurality of characteristics to the first one of the plurality of characteristics.

The method may comprise determining by the at least one processor that the predetermined end game condition is satisfied when the subset of tiles all have a predefined one of the plurality of characteristics.

The tiles may each have one of two different characteristics, each tile of the subset changing from one characteristic to another each time a game element associated with the respective tile is removed.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Embodiments of the invention will now be described by way of the accompanying drawings in which.

DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement the way in a number of variations.

Figure 7:
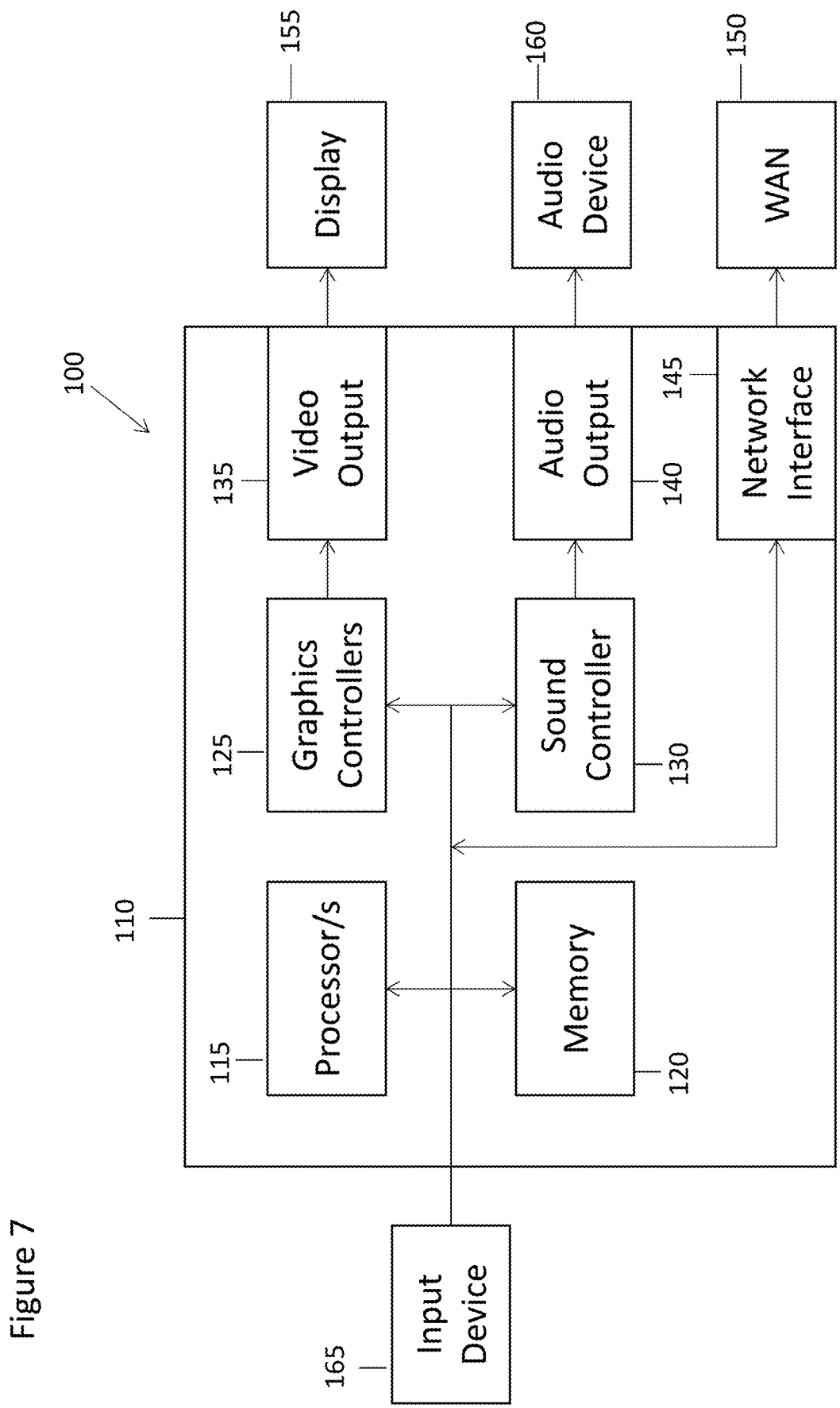
FIG. 7 shows an example user device in which some embodiments may be provided.

A schematic view of a user device 100 according to an embodiment is shown in FIG. 7. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 6:
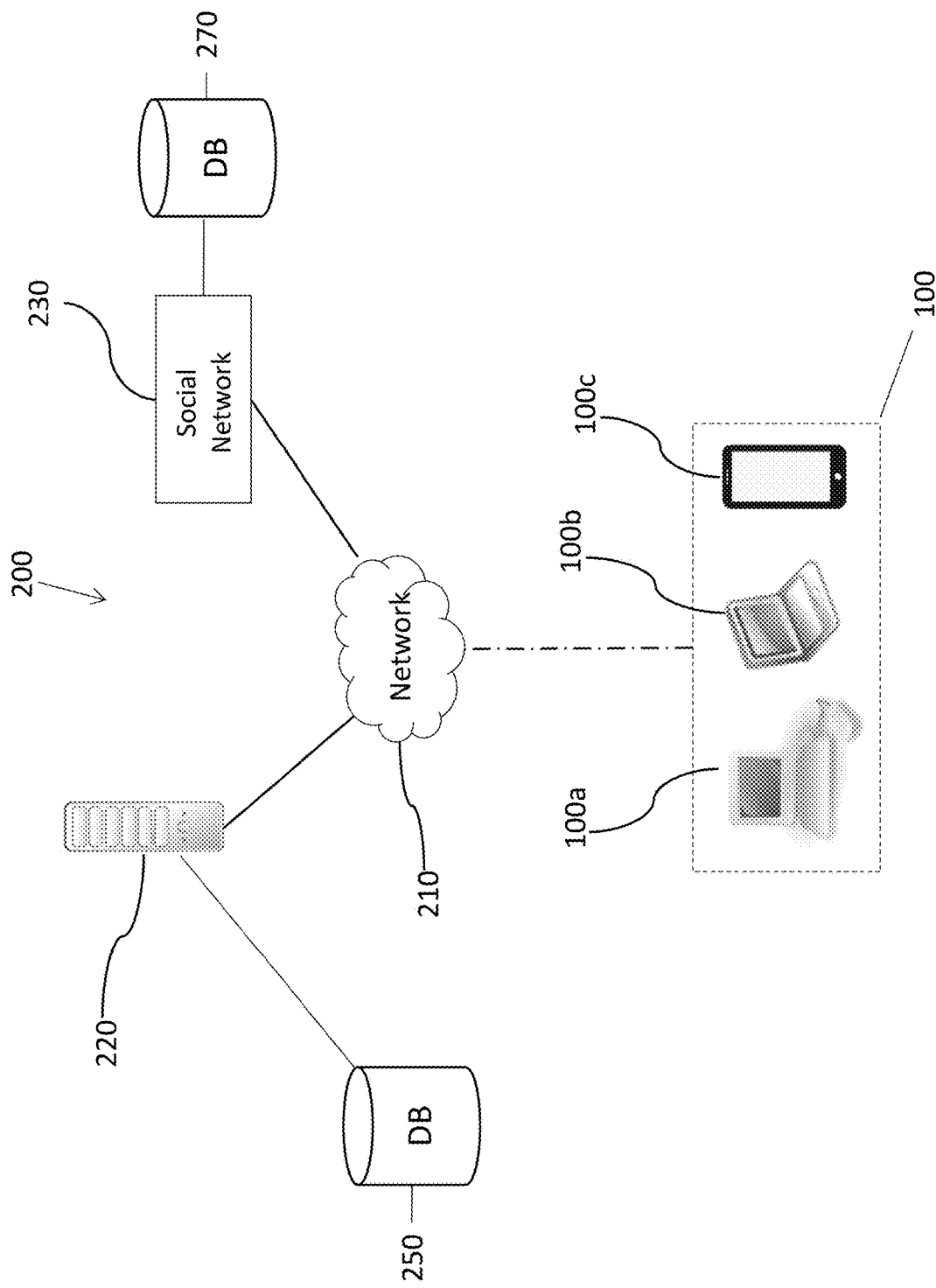
FIG. 6 shows an example system in which some embodiments may be provided.

FIG. 6 schematically shows a system 200 according to an embodiment. The system 200 comprises a server 220 which may store or be in communication with database 250 which may store game player's details, profiles, statistics etc. In practice, one or more databases 250 may be provided. Where more than one server 220 is provided, the database(s) 250 may be provided in one server 220 or across two or more servers. The server 220 may also have a games data function. This may comprise one or more units of memory to store the computer game program, user behaviour data and a processor to run the games program and process the user behaviour data.

The server 220 may communicate via, for instance, the internet 210 to one or more client or user devices 100, shown in FIG. 6 by way of example as user devices 100*a*, 100*b* and 100*c*, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 1:
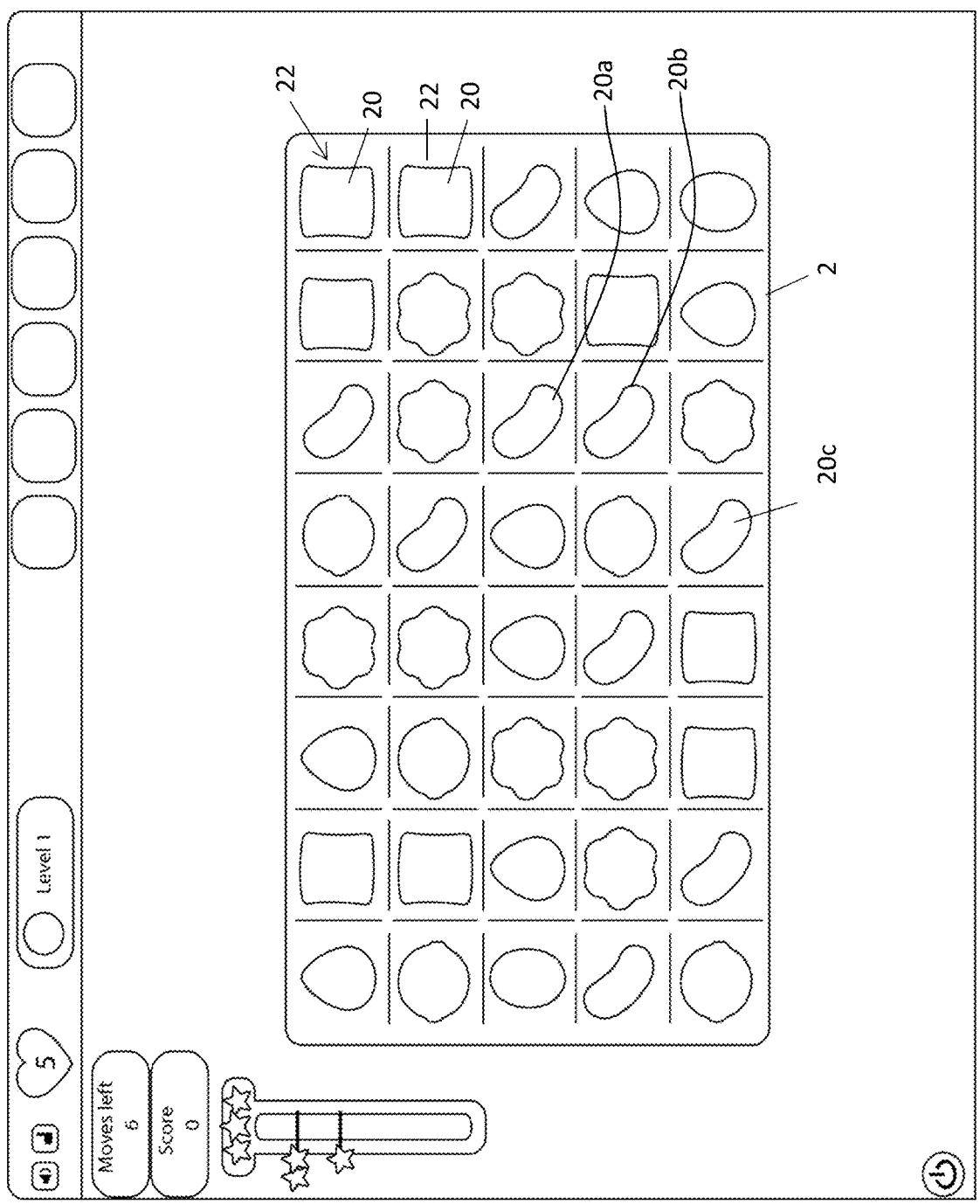
FIG. 1 is a schematic diagram of a game board of a match three game illustrating a basic example of a match three game.

FIG. 1 shows a display of a known version of a match 3 switcher game called Candy Crush Saga™. FIG. 1 illustrates a game board 2 with a plurality of game elements 20. The game elements are each of six different shapes and colours. Of course in other embodiments, there may be more or less than six different game elements. Each game element type may be defined by one or more of particular characteristics, for example a particular shape and colour combination. Each game element is supported by a tile 22.

Figure 2:
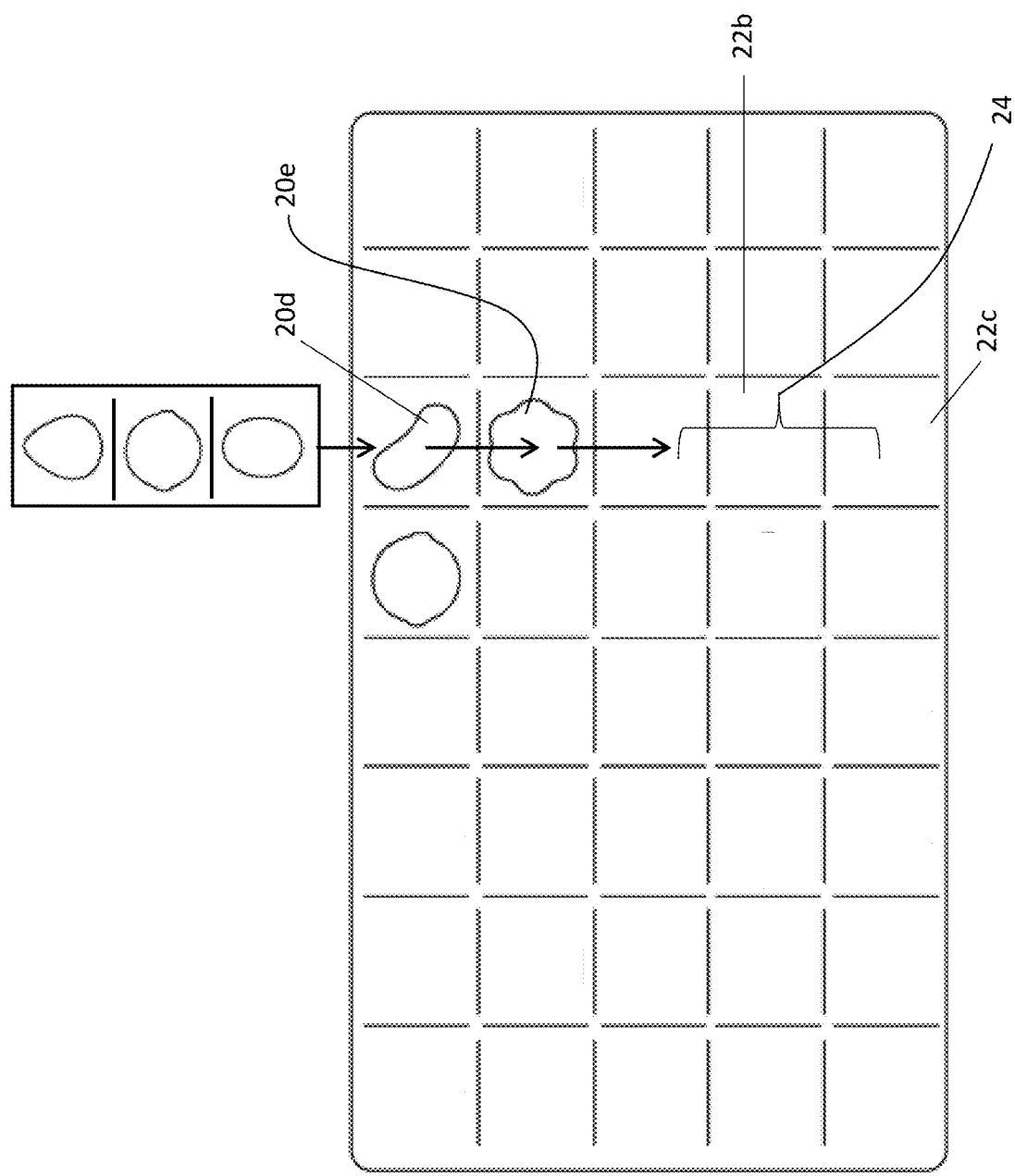
FIG. 2 is a schematic diagram illustrating how a game board is populated with replacement game elements.

In the known version of the match 3 switcher game, the aim of the game is to swap game elements in the shape of candies with each other to make moves on the game board. To gain points the player has to make moves that create matches of at least three of the same game element or candy. In doing so, the player gains points and the matched game elements are removed. As a result new game elements fall into place from the top of the game board in order to fill any spaces created. Assume in FIG. 1 that game element 20*c* is moved one place to the right to form a three-line match with game elements 20*a* and 20*b*. Turning now to FIG. 2, this has the effect of game elements 20*a*, 20*b* and 20*c* being removed or "disappearing" from the game board, creating a visual effect (animation) on the screen to indicate the disappearance, such as a minimal explosion effect. The two game elements which were directly above game elements 20*a* will now fall downwards into the spaces created by the removal of game elements 20*a*, 20*b* and 20*c*. Thus, game element 20*e* will end up at the location 22*c*, and game element 20*d* will end up at the location 22*b*. In addition, three new game elements are provided and fall downwards into the game board to fill the remaining three spaces above location 22*b*. The new game elements may be generated at random. The user then has a new game board on which to play a subsequent move.

The so-called physics of the game elements on generation of a new game board after each move is the same in the existing version of the game called Candy Crush. That is, game elements drop down from above the game board at a set speeds and from the top of the game board. In an alternative version detailed in U.S. Ser. No. 14/316,274 and launched under the name Candy Crush Soda, the physics can vary so that the speed and direction of replacement game elements can alter.

In the following, a game board is made up of game positions or tiles each of which is covered by a game element. One or more of the tiles may be a so-called toggle tile. A toggle tile will initially have a first characteristic or set of characteristics. When a game element associated with a toggle tile is removed, then that toggle tile will change to have a second different characteristic or set of characteristics. A game element may be removed as a result of a match being made which includes that game element or there is an interaction with a game element on the toggle tile as a result of a match (for example the setting off of a line blast booster or the like) or a special booster is used to remove that game element.

In the case where the toggle tile has two states, when the game element on the toggle tile is removed, that toggle tile will change from the second different characteristic or set of characteristics back to the first characteristic or set of characteristics.

It should be appreciated that in some embodiments a toggle tile may have more than two states. Consider the example of three states of red, blue and green. If the toggle tile state is initially red, it will then change to a blue state if the game element on the toggle tile is removed. The toggle tile will then change to green if further game element on the toggle tile is removed. Further interaction will cause the toggle tile to change to red and so on.

The number of states for a toggle tile may be selected depending on the complexity of the game.

In some embodiments, at least two toggle tiles may have different numbers of available states.

In some embodiments, the different states of the toggle tile may be represented by visually distinctive appearances on the displayed game board. The non-toggle tiles may also be displayed in a visually distinct manner such that they can be determined that they are not toggle tiles.

It will be understood that each tile has a game board position, but game elements are removed and replaced over the tiles. The toggle tile may be a static tile underlying the game element which may change.

The toggle tiles may have one of a plurality of available characteristics or states. In some embodiments, the available characteristics may be two different characteristics. In some embodiments, there may be more than two different characteristics. The different characteristic or set characteristics may comprise one or more colour, pattern, luminosity, animation or the like.

The characteristics of a toggle tile may be changed when a game element on the toggle tile is in a match. The characteristics of a toggle tile may be changed when a game element on the toggle tile is removed as a result of a match being made which is triggered an effect. For example a booster or the like may be triggered by a match to thereby remove the game element on a particular toggle tile. The characteristics of a toggle tile may be changed when a game element on the toggle tile is removed using game element removal booster.

Figure 3A:
FIGS. 3a to 3c show a game board at different times during a game mode.
Figure 3B:
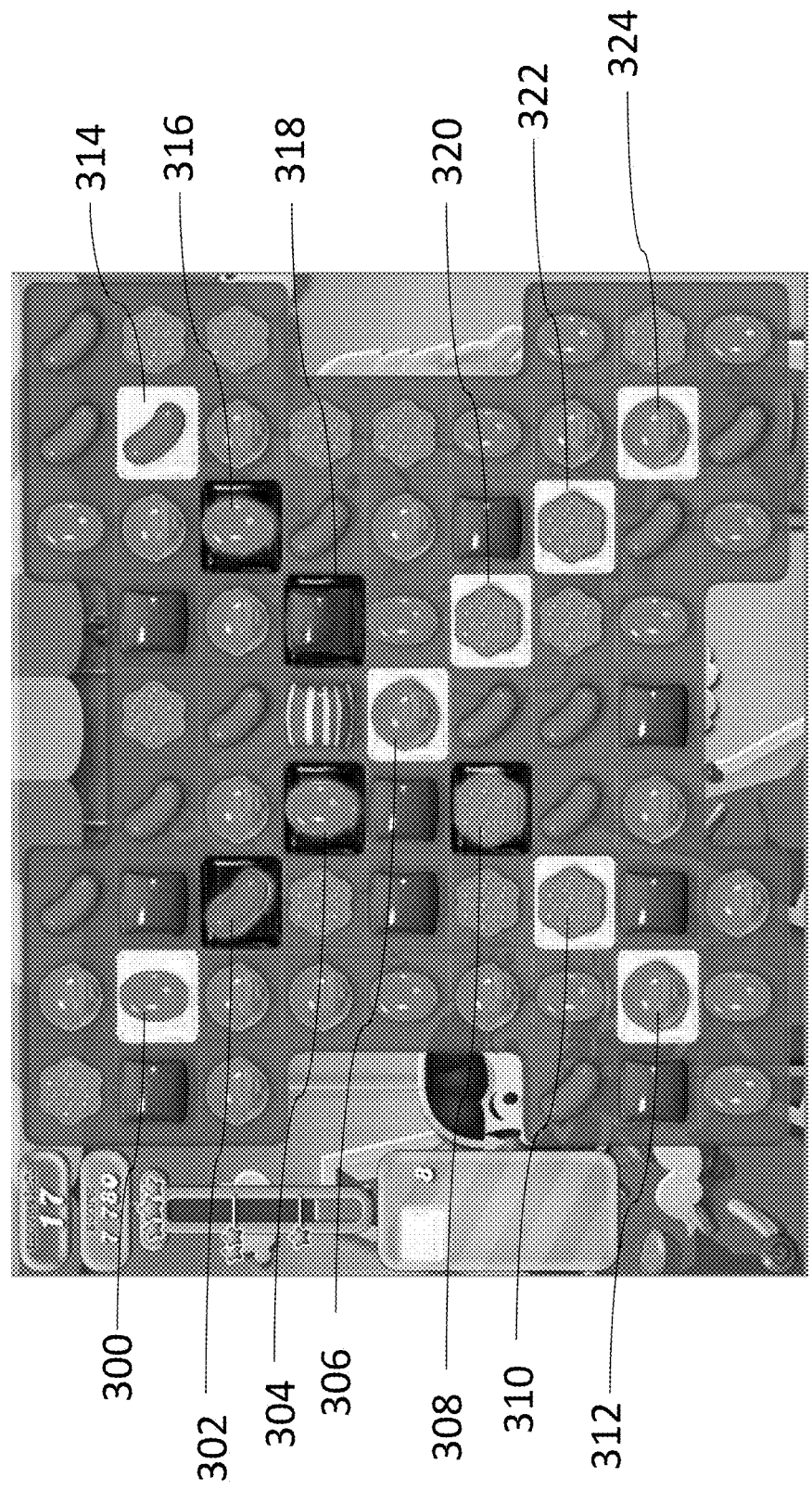
Figure 3C:

Reference is made to FIGS. 3a to 3c which show some example game boards during a game. The toggle tiles have two characteristics or states which they toggle between. In this example the tiles toggle between white and black.

The game board shown in FIG. 3a shows toggle tiles 300 to 324 which are arranged in an "X" across the game board. In this example, all of the toggle tiles 300 to 324 have the same characteristic which in this example is colour (for example white).

In the game board shown in FIG. 3b, toggle tiles 300, 306, 310, 312, 314, 320, 322 and 324 are still white but toggle tiles 302, 304, 308, 316 and 318 have a different characteristic, for example black.

In the game board shown in FIG. 3c, toggle tiles 306, 318, 320, 322 and 324 are white but toggle tiles 300, 302, 304, 308, 310, 312, 314 and 316 are black. As can be seen toggle tile 318 which was black in the game board of FIG. 3b has toggled back to white.

In some embodiments, the aim is to get all the all of the toggle tiles 300 to 324 have the same characteristic which in this example is now black in order to complete the level. It should be appreciated that the steps performed by at least one processor of the device during the game mode illustrated in FIGS. 3a to 3c will be described in more detail with reference to FIGS. 4a and 4b.

Figure 4A:
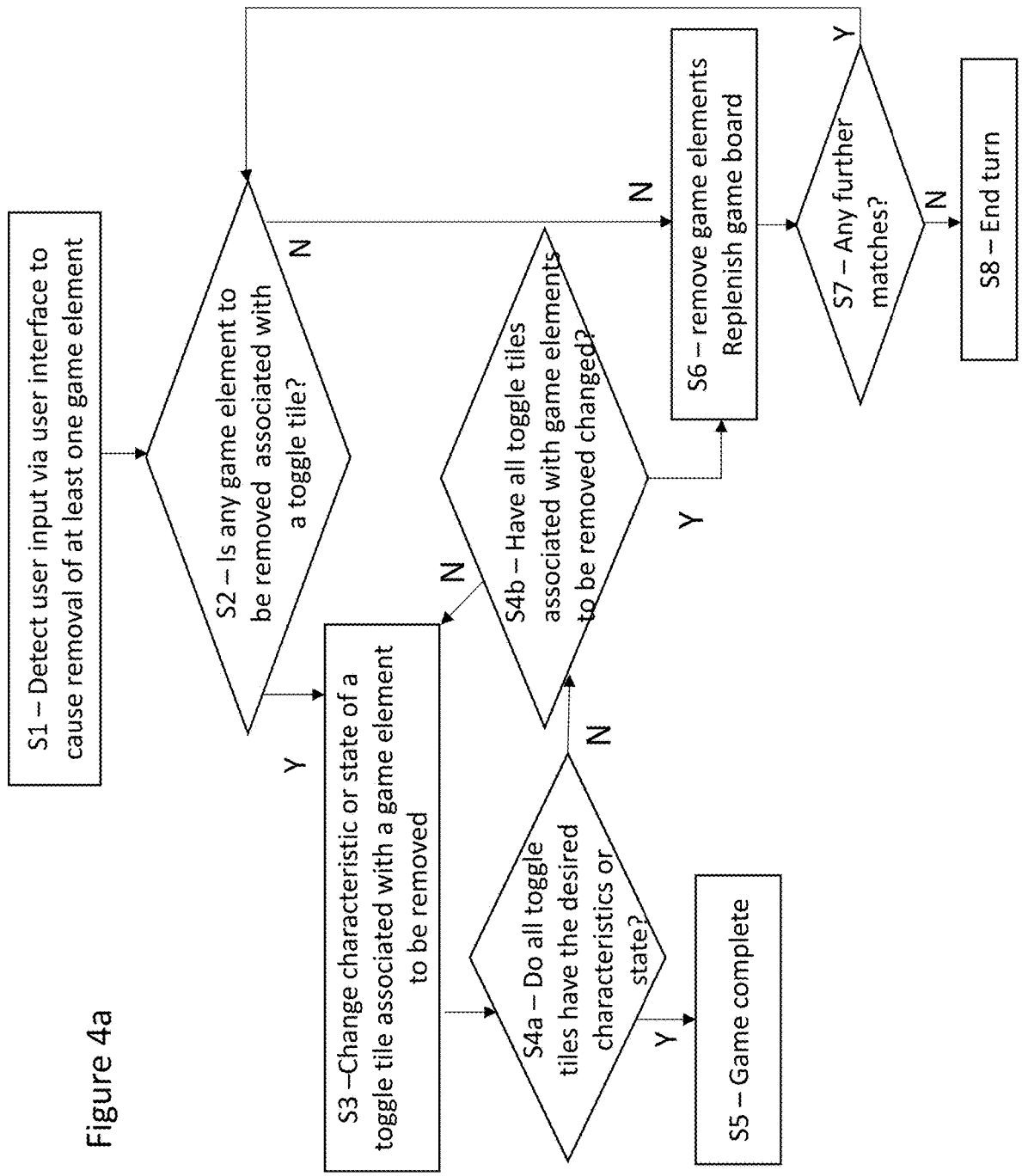
FIG. 4a is a first flow chart showing steps performed by a user device during the game mode illustrated in FIGS. 3a to c.

Reference is made to FIG. 4a which shows a first method according to an embodiment.

In step S1, user input via the user interface which will cause the removal of at least one game element is detected. This may be responsive to the user interacting with the game board via the user interface (for example a touch screen on which a game board of game elements is displayed). For example, the user may interact with the user interface to swap the position of two game elements to make a match or the user may select a booster to remove a game element. Alternatively the user may make a move which will cause a booster such as a blaster to be activated which will remove game elements.

In step S2, the position of game elements which are to be removed are analysed to determine if any of game elements which are to be removed are associated with a toggle tile.

If there is no game elements to be removed associated with a toggle tile, then the next step is step S6 which will be discussed in more detail below.

If one or more game elements to be removed are associated with respective toggle tiles, then the next step is step S3. The state or characteristic of one of the toggle tiles associated with one of the game elements to be removed is updated. In the context of the example of FIG. 3, this would be change the state of the tile from white to black, for example. In step S4a, it is determined if all of the toggle tiles have the state or characteristics defined for completion of the game or a level of the game. By way of example, this may be to determine if all the toggle tiles have the same required characteristic or state. In one embodiment, the aim is to have all of the toggle tiles having the same characteristic, for example a particular colour.

It should be appreciated that different embodiments may have different aims. For example, the toggle tiles may all start with the same characteristic, for example a particular colour, and the aim is to change the toggle tiles to have the same, but a different characteristic to the first characteristic, for example a different colour. In some embodiments, one area of the game board may start with toggle tiles having a first characteristic and another area of the game board may start with toggle tiles having a second characteristic. The aim may be for the toggle tiles having the first characteristic to all change to the second characteristic and for the toggle tiles having the second characteristic to all change to the first characteristic.

In other embodiments, the aim may be to achieve a pattern of toggle tiles having a particular set of characteristics. For example, it may be the aim to have alternating toggle tiles with different characteristics or colours.

If all of the toggle tiles satisfied the defined criteria for completion of the game, then the next step is step S5 where the game or level or the game is determined to have been completed.

If it is determined that not all of the toggle tiles satisfied the defined criteria for completion of the game, then the next step is step S4b. In step S4b, it is determined if all of the toggle tile characteristics or states have been changed for all the relevant game elements to be removed. If not, the next step will be step S3. Thus, the state of one toggle tile is updated and after each update of one toggle tile state, a check is made to see if the toggle tiles all satisfied the required criterial for game completion.

It is determined that all of the toggle tile characteristics or states have been updated for all the associated game elements to be removed, then the next step is step S6. In step S6, the game elements are removed from the displayed game board, the toggle tiles will be displayed with the appearance associated with their respective current state or characteristic and the game board is replenished to replace the game elements which have been removed.

In step S7, it is determined if as a result of the replenishment of game elements there are any further game element to be removed, for example as a result of a match. If not the next step is step S8, in which the turn or move is ended. If there are one or more further game elements to be removed, then the next step is step S2.

Figure 4B:
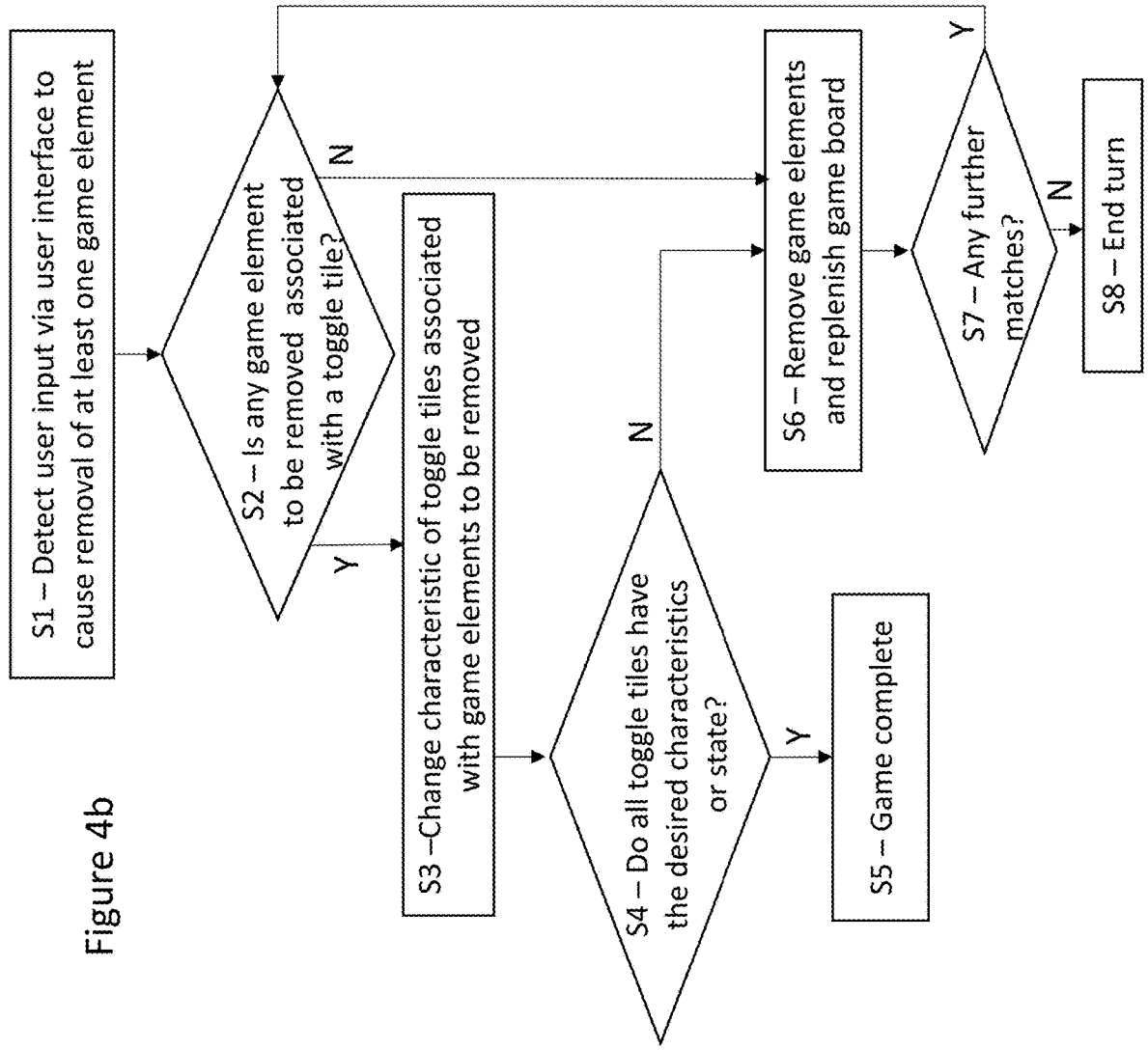
FIG. 4b is a second flow chart showing steps performed by a user device during the game mode illustrated in FIGS. 3a to c.

Reference is made to FIG. 4b which shows a second embodiments.

In this example embodiments, steps S1 and S2 are the same as in FIG. 4a. However in the second embodiment of FIG. 4b, in step S3, instead of changing the state of one toggle tile at a time, the state of all the toggle tiles associated with game elements to be removed are updated.

Step S4 is then the same as step S4 in FIG. 4a except that if all the toggle tiles do not have the predefined characteristics or game state required to game completion, the next step is step S6. Step S6, step S7 and step S8 are as described in relation to FIG. 4a.

It should be appreciated that in some embodiments, the toggle tiles are updated after a match is made and then a check is made to see if the toggle tile condition is met. This is done before the game board is replenished. In some embodiments, the check is made before each replenishment of the game board. This allows the user to be more in control of the game board when making a match and thereby feel that they are influencing the game play. In some embodiments, this may allow the difficulty of a game to be more easily controlled.

The order in which the steps shown in FIG. 4a or 4b are carried out in other embodiments may differ from that shown. In some embodiments, one or more steps may be left out. In some embodiments, one or more additional steps may be performed. In some embodiments, at least one step may be performed in parallel. In some embodiments the game elements may be removed prior to the updating of the respective tile characteristic, after the updating of the tile characteristic or any suitable point in the method.

In one modification to the arrangement shown in FIG. 4b, step S3 will instead simply modify the state or characteristic of the respective toggle tile associated with the respective game elements to be removed. Step S3 will then be followed by step S6. In the event that there no further game elements to be removed in step S7, this will be followed by step S4. If all the toggle tiles do not have the predefined characteristics or game state required to game completion, the next step is step S8. In other words, in this embodiment, the toggle tiles' state or characteristics are only checked when all the game elements have been removed, after the replenishment of the game board has been completed and no further game elements are to be removed.

One or more of the steps of FIG. 4a or 4b may be performed by at least one processor.

In some embodiments, a move or time limitation may be provided. If the user does not manage to get the toggle tile state or characteristics to the predefined end game state within the time limit or move limit the game is over and the user has failed to complete the game.

Figure 5:
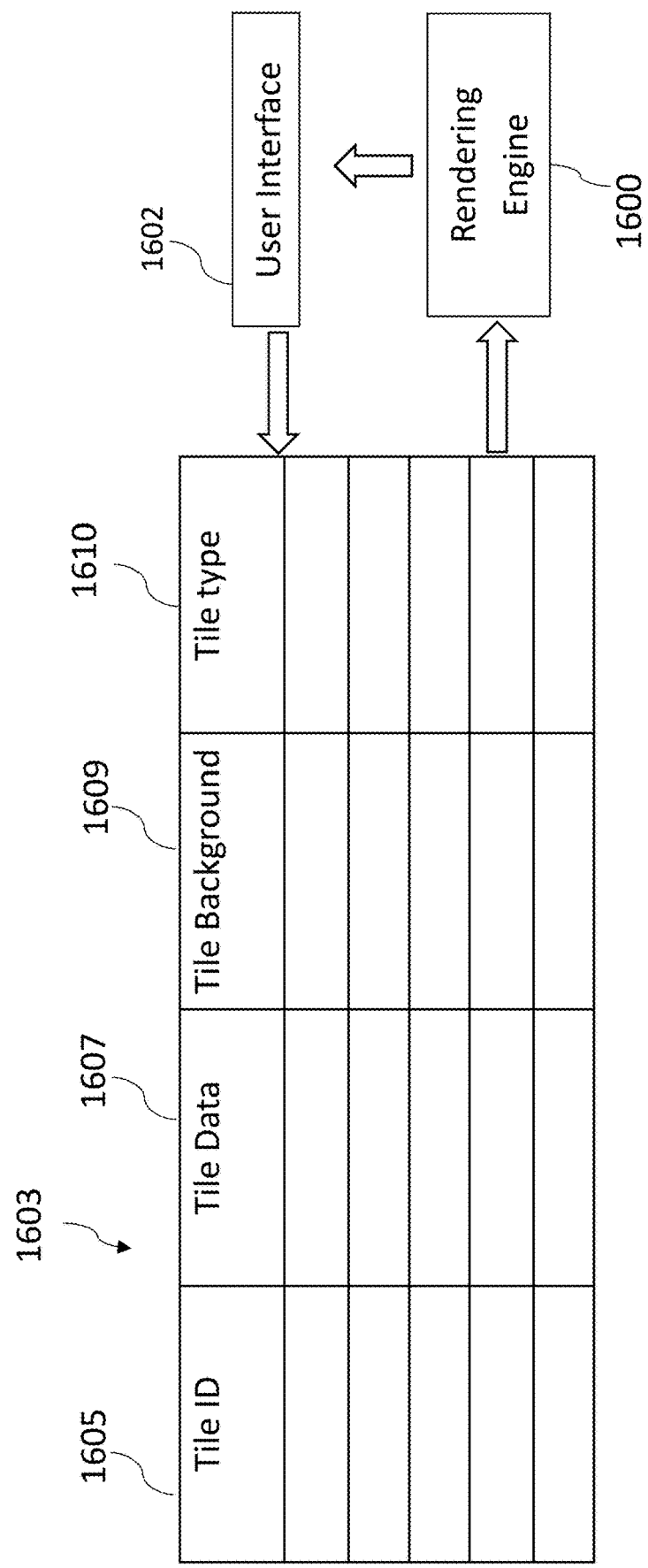
FIG. 5 schematically shows a data structure for managing tile data, showing the interrelation between the data structure and a rendering engine of a graphics controller.

FIG. 5 illustrates a data structure for managing the tile background appearance, and schematically illustrates the interrelation between the data structure 1603 and a rendering engine 1600 of the graphics controller 180. The graphics controller is in the user device as described previously. The data structure 1603 can be held in any suitable storage circuitry, such as in the memory of the user device, as described previously. The rendering engine 1600 drives the display on a user interface 1602 which receives the video output from the graphics controller.

The data structure 1603 is responsible for controlling the game board displayed. Each tile has a tile ID 1605. The tile ID 1605 can define the position on the user interface where the tile is to be positioned. This allows the rendering engine 1600 to generate that tile at an appropriate position on the user interface display 1602. Each tile ID 1605 is associated with tile data 1607 which defines what game element it has associated with it, tile background data 1609 which defines one or more characteristics of the tile and tile type data 1610. The tile type data will define if the tile is a toggle tile and if so, the tile background will define the current characteristic or state (e.g. colour) of the toggling tile.

After a move has been made or after there has been some change to the game board, the game engine will update this data such that updated tile image will be rendered by the rendering engine and displayed. The timing of the updating of the tile background data is as discussed in relation to FIG. 4.

Figure 8:
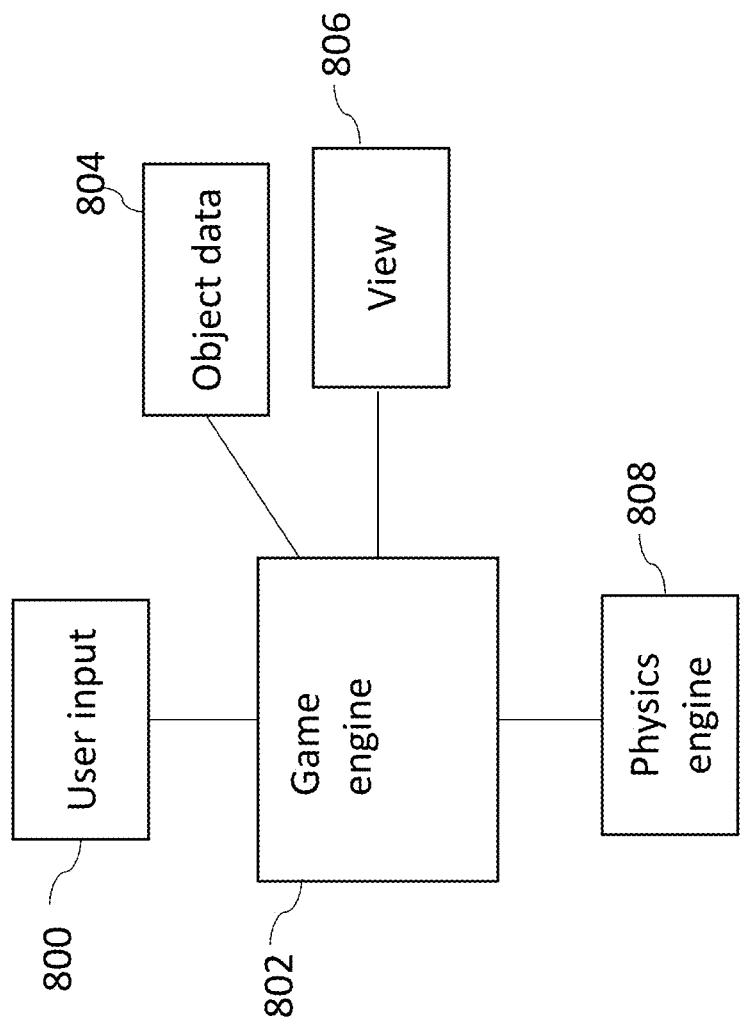
FIG. 8 is a schematic diagram showing the modules and functions associated with carrying out the operating of embodiments.

Reference is made to FIG. 8 which schematically shows the functional blocks of an embodiment, which may enable game play such as discussed previously. A user input block 800 is shown. This captures the user input and feeds the input to a game engine 802. In the context of the game of some embodiments, this user input may be which game elements are switched by a user. This user input can be via any suitable user interface, such as discussed earlier. One or more of the functional blocks of FIG. 8 may be performed by at least one processor.

The game engine 802 will process the information provided by the user input. The game engine 802 (for example a game model) will determine if a valid combination has been made.

Each tile has object data associated therewith. The object data 804 may be stored in any suitable memory location. In some embodiments, the object data may be provided by the data structure described previously. In some embodiments, the object data may be considered to be part of the game engine and in other embodiments may be considered to be outside the game engine. The object data may provide information as to the properties of a tile and its associated game element. These properties can include attribute information of the tile and/or the game element such as colour and/or whether or not a game element has a particular function such as a so-called booster function. The object data may include the position data, that is, information representing the position of the tile and its game element in the displayed image.

In some embodiments, the game engine will check if the game elements satisfies the rule or rules for a valid match. The rule or rules which define whether or not a match condition has been satisfied. The match condition will be dependent on the game. In some embodiments, a match condition will be satisfied if the game elements are arranged to provide a sequence of at least three adjacent first objects sharing at least one same characteristic. In some embodiments, the game elements of the sequence are removed.

Thus, the game engine will be in control of the matching mechanism. The game engine will have access to data for each tile including its position and the game elements associated with the tile, and will be able to determine if a match condition has been met. If a match condition is met, the game elements in the match may be removed. The game engine may also determine if the toggling tiles satisfied the required game completion condition for the game.

It should be appreciated that in other embodiments, the game may use any type of match mechanic such as switching, sliding or linking. The game elements may be any suitable game element and in some embodiments may be letters. In that scenario a match will occur when the letters match a word. Preferably the word is at least three letters long.

A physics engine 808 is provided which is configured to control the movement of moving game elements on the display. The tiles are static is some embodiments.

The physics engine 808 may be part of the game engine 802.

A view function 806 uses of the object data to provide the displayed image with which the user is able to view and/or interact.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device having:
   a display configured to display game elements in a game board of tiles of a computer implemented game, a subset of specific ones of the tiles each having one of a plurality of available characteristics;
   a user interface configured to detect user input when a user engages with a game element of the displayed game elements;
at least one processor configured to:
   (a) receive a detected user input and in response thereto determine that one or more game elements are to be removed from the displayed game board;
   (b) determine, for each of the one or more of the game elements to be removed, if the game element is associated with a respective tile of the subset of specific tiles, and in response to said determination that a respective game element of the one or more of the game elements is associated with a respective tile of the subset of specific tiles, change a respective characteristic of only the ONE OR MORE respective tiles of the subset of specific tiles ASSOCIATED WITH THE ONE OR MORE GAME ELEMENTS TO BE REMOVED, THE RESPECTIVE CHARACTERISTIC BEING CHANGED from a current characteristic to a different one of the plurality of characteristics; and
   (c) determine for the subset of specific tiles if the respective characteristics of all of the tiles of the subset of specific tiles satisfy a predetermined end game condition.

2. The computer device as claimed in claim 1, wherein the at least one processor is configured to, in response to said determination that a plurality of the game elements are associated with the respective tile of the subset of specific tiles, update a respective characteristic of a single one of the tiles of the subset of specific tiles and then to determine for the subset of specific tiles if the respective characteristics of all of the tiles of the subset of specific tiles satisfy a predetermined end game condition, and if not to repeat the updating and determining for at least one further game element associated with a respective one of the subset of specific tiles until either the predetermined end game condition is satisfied or all of tiles of the subset of specific tiles associated with respective game elements have had their respective characteristic updated.

3. The computer device as claimed in claim 1, wherein the at least one processor is configured to, in response to said determination that a plurality of the game elements are associated with respective one of the subset of specific tiles, update a respective characteristic of all of the tiles of the subset of specific tiles associated with respective game elements and then to determine for the subset of specific tiles if the respective characteristics of all of the tiles of the subset of specific tiles satisfy a predetermined end game condition.

4. The computer device as claimed in claim 1, wherein the at least one processor is configured to generate replacement game elements for the game board displayed by the display, wherein the determining for the subset of specific tiles if the respective characteristics of all of the tiles of the subset of specific tiles satisfy the predetermined end game condition is only performed when the game board is replenished and no further game elements are to be removed.

5. The computer device as claimed in claim 1, wherein the at least one processor is configured when the predetermined end game condition is not satisfied to generate replacement game elements for the game board displayed by the display, wherein when one or more game elements are to be removed as a result of the generation of the replacement game elements, the at least one processor is configured to repeat steps (b) and (c).

6. The computer device as claimed in claim 1, wherein the at least one processor is configured to detect a match game condition associated with the game elements to remove at least three game elements from the display.

7. The computer device as claimed in claim 1, wherein the at least one processor is configured to detect a triggering of a game element removal object in response to a match game condition to cause the removal of at least one game element from the display.

8. The computer device as claimed in claim 1, wherein the at least one processor is configured to detect a use of a game element removal object to cause the removal of at least one game element from the display.

9. The computer device of claim 1, wherein the subset of the specific tiles have a fixed position with respect to the game board.

10. The computer device as claimed in claim 1, wherein the display is configured to display the game board at a beginning of a game, the subset of specific tiles having a first one of the plurality of characteristics.

11. The computer device as claimed in claim 10, wherein the at least one processor is configured to determine that the predetermined end game condition is satisfied when the subset of specific tiles have a different one of the plurality of characteristics to the first one of the plurality of characteristics.

12. The computer device as claimed in claim 1, wherein the at least one processor is configured to determine that the predetermined end game condition is satisfied when the subset of specific tiles all have a predefined one of the plurality of characteristics.

13. The computer device as claimed in claim 1, where the subset of specific tiles each have one of two different characteristics, each tile of the subset of specific tiles changing from one characteristic to another each time a game element associated with the respective tile is removed.

14. The device of claim 1, wherein there are n available characteristics such that a respective tile of the subset of specific tiles has a first one of the n available characteristics, and each time a game element associated with the respective tile of the subset of tiles is removed, the respective tile of the subset of tiles has a next one of the available characteristics, wherein the at least one processor is configured to, after n game elements associated the respective tile have been removed, cause the respective tile of the subset of tiles to have the first one of the available characteristics.

15. The device of claim 1, wherein the at least one processor is configured to determine whether the detected user input causes a match condition to be satisfied, and responsive to determining that the match condition is satisfied, remove the one or more game elements satisfying the match condition from the displayed game board.

16. A non-transitory computer readable storage device storing instructions that, when executed by at least one processor of a computer device causes the at least one processor to:
   cause display of game elements in a game board of tiles of a computer implemented game, a subset of specific ones of the tiles each having one of a plurality of available characteristics;
   receive a detected user input when a user engages with a game element of the displayed game elements and in response thereto determine that one or more game elements are to be removed from the displayed game board;
   determine, for each of the one or more of the game elements to be removed, if the game element is associated with a respective tile of the subset of specific tiles, and in response to said determination that a respective game element of the one or more of the game elements is associated with respective tile of the subset of specific tiles, change a respective characteristic of the respective tile of the subset of specific tiles from a current characteristic to a different one of the plurality of characteristics; and
   determine for the subset of specific tiles if the respective characteristics of all of the tiles of the subset of specific tiles satisfy a predetermined end game condition.

17. A computer implemented method performed by a computer device, the computer device having at least one processor, at least one memory, a display, and a user interface, the method comprising:
   displaying by the display game elements in a game board of tiles of a computer implemented game, a subset of specific ones of the tiles each having one of a plurality of available characteristics;
   detecting user input via the user interface when a user engages with a game element of the displayed game elements;
   receiving by the at least one processor a detected user input and in response thereto determine that one or more game elements are to be removed from the displayed game board;
   determining by the at least one processor, for each of the one or more of the game elements to be removed, if the game element is associated with a respective tile of the subset of specific tiles and in response to said determination, that one or more of the game elements are associated with respective one of the subset of specific tiles, change a respective characteristic of the respective tile of the subset of specific tiles from a current characteristic to a different one of the plurality of characteristics; and
   determining by the at least one processor for the subset of specific tiles if the respective characteristics of all of the tiles of the subset of specific tiles satisfy a predetermined end game condition.

* * * * *